US007050836B2

(12) United States Patent
Pääkkönen

(10) Patent No.: US 7,050,836 B2
(45) Date of Patent: May 23, 2006

(54) SYSTEM AND METHOD FOR PROVIDING MULTIMEDIA MESSAGING SERVICE (MMS) RINGING IMAGES ON MOBILE CALLS

(75) Inventor: Tarja Pääkkönen, Helsinki (FI)

(73) Assignee: Nokia Corporation, Espoo (FI)

( * ) Notice: Subject to any disclaimer, the term of this patent is extended or adjusted under 35 U.S.C. 154(b) by 232 days.

(21) Appl. No.: 10/323,237

(22) Filed: Dec. 18, 2002

(65) Prior Publication Data

US 2004/0121818 A1    Jun. 24, 2004

(51) Int. Cl.
*H04B 1/38* (2006.01)
*H04M 1/00* (2006.01)
*H04Q 7/20* (2006.01)

(52) U.S. Cl. .................. 455/567; 455/466; 455/415

(58) Field of Classification Search .............. 455/567, 455/466, 419, 412.1, 412.2, 415; 709/217, 709/218, 219; 379/373.01, 373.02, 376.01
See application file for complete search history.

(56) References Cited

U.S. PATENT DOCUMENTS

| 6,246,761 | B1 * | 6/2001 | Cuddy ................... | 379/418 |
| 6,418,330 | B1 * | 7/2002 | Lee ...................... | 455/567 |
| 6,675,008 | B1 * | 1/2004 | Paik et al. .............. | 455/415 |
| 6,718,178 | B1 * | 4/2004 | Sladek et al. ........... | 455/466 |
| 2001/0029194 | A1 * | 10/2001 | Ketola et al. ......... | 455/567 |
| 2002/0082054 | A1 * | 6/2002 | Keinonen et al. ...... | 455/567 |
| 2002/0115456 | A1 * | 8/2002 | Narinen et al. ........ | 455/466 |
| 2003/0109251 | A1 * | 6/2003 | Fujito et al. ........... | 455/414 |

FOREIGN PATENT DOCUMENTS

| EP | 1 117 245 A1 | 7/2001 |
| WO | WO 02/37369 A2 | 5/2002 |

OTHER PUBLICATIONS

"WAP MMS Architecture Overview", Version Apr. 25, 2001, pp. 1-23.
"Wireless Application Protocol Wireless Session Protocol Specification", WAP-230-WSP, Approved Version Jul. 5, 2001, pp. 1-131.
"Wireless Application Protocol MMS Encapsulation Protocol", Version Jan. 5, 2002, pp. 1-39.
"WAP MMS Client Transactions", Version Jan. 15, 2002, pp. 1-33.
"3rd Generation Partnership Project; Technical Specification Group Services and System Aspects; Multimedia Messaging Service (MMS); Stage 1 (Release 5)", 3GPP TS 22.140, V5.2.0 (Jun. 2002), 14 pages.

(Continued)

Primary Examiner—Lee Nguyen
Assistant Examiner—Lewis West
(74) Attorney, Agent, or Firm—Morgan & Finnegan, L.L.P.

(57) ABSTRACT

System, apparatus and method for providing multimedia messaging service (MMS) ringing images on mobile calls. In one embodiment, a ringing image comprises a combination of sound and images/video with optional textual information and a presentation format. An exemplary method includes: receiving an incoming call from an originating mobile station; receiving a multimedia messaging service (MMS) message associated with the incoming call, wherein the MMS message contains ringing image data including image data and ring tone data; presenting the ringing image data to a user of the terminating mobile station; and in response to presentation of the ringing image data, receiving an indication from the user to answer the incoming call. The incoming call and the MMS message are preferably received substantially simultaneously.

47 Claims, 8 Drawing Sheets

OTHER PUBLICATIONS

"3rd Generation Partnership Project; Technical Specification Group Terminals; Multimedia Messaging Service (MMS); Functional description; Stage 2 (Release 5)", 3GPP TS 23.140, V5.3.0 (Jun. 2002), 155 pages.

* cited by examiner

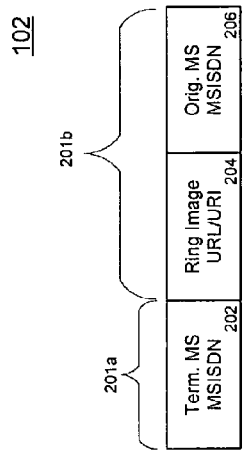
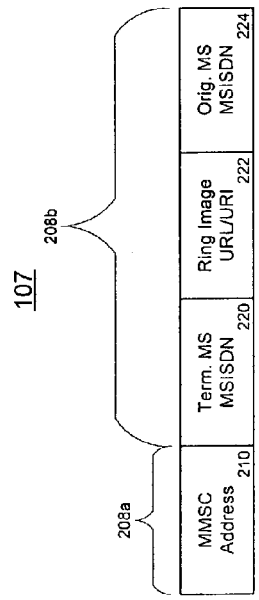
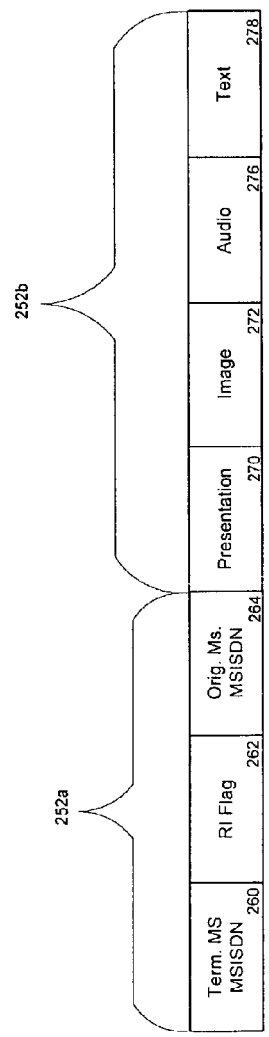
FIG. 2A
FIG. 2B
FIG. 2C

SYSTEM AND METHOD FOR PROVIDING MULTIMEDIA MESSAGING SERVICE (MMS) RINGING IMAGES ON MOBILE CALLS

FIELD OF THE INVENTION

This invention relates to wireless communications systems in general, and more particularly, to a method and system for providing messaging service on mobile calls.

BACKGROUND OF THE INVENTION

The explosive growth of the cell phone industry over the past several years has forced cell phone manufacturers to continually offer new and improved services with each generation of new cell phones. New services such as call waiting, caller ID, three-way calling, call forwarding, and voice dialing have become standard in the newer generation cell phones. In addition, the popularity of the Internet and the ease with which users can obtain and share information over the Internet have created new areas for growth. Given the pervasiveness of the Internet in our everyday lives, it is understandable why there is a great demand to access the Internet via a wireless device such as a cell phone. Many currently available cell phones and other wireless devices are equipped with browser software (often called "microbrowsers") that enables the wireless devices to access hypermedia content on the Internet. However, many earlier generation wireless devices are not equipped with microbrowsers. The lack of a microbrowser restricts the ability of such devices to access hypermedia content on the Internet.

Limited Internet access has been provided to such wireless devices using a service known as Short Message Service ("SMS"), which is available on many such devices. SMS allows users of certain wireless devices to send and receive alphanumeric messages of limited length (e.g., up to 160 characters). SMS is similar to paging, however, SMS does not require that the wireless device be active and within range when a message is sent. If a wireless device is either inactive or out of range, the SMS message generally is held for a period of time until the wireless device either returns to active status or is within range.

SMS-based Internet access is primarily performed by a submission of one or more "keyword" messages from the wireless device to a predetermined address or telephone number serviced by a server. The server prepares an SMS message that includes the information based on the "keyword" and delivers the SMS message back to the requesting wireless device. An example of this type of access would be a request for a stock quote. The wireless user would enter the keyword "QUOTE" followed by the stock symbol. A server would receive the SMS message and the server would have to decode the keyword and attempt to obtain appropriate information requested by the wireless device. Once the quote value was determined, the server would create an SMS message containing the corresponding quote information and forward it to the requesting wireless device.

Wireless devices operate on several different standards throughout the world. The United States, for example, uses a digital cellular system based on a IS-95 and CDMA 2000 standard. Code Division Multiple Access ("CDMA") allows many users to share a common frequency/time channel for transmission by spreading the individual call signals with different codes. Likewise, the European community utilizes a system known as the Global System for Mobile Communications ("GSM"). GSM is based upon a Time Division Multiple Access ("TDMA") and a Frequency Division Multiple Access ("FDMA") standard. Unlike CDMA, each user is given either a temporal or frequency slot to transmit their data. Both CDMA 2000 and the GSM systems utilize separated channels for transmitting data. These channels can be mixed for higher capacity throughput if needed. In addition, the channels can be either traffic channels or control channels.

The SMS messaging service is typically carried on a Standalone Dedicated Control Channel ("SDCCH") in a GSM operating environment. The SDCCH channel operates independently of traffic channels ("TCHs"). Therefore, users of the cell phones may receive SMS messages while simultaneously carrying on a conversation with another user or transmitting data over the TCHs.

The SMS text messaging service handles almost 15 billion character-based messages per month worldwide. Given this enormous popularity, a new and revolutionary way of sending messages was developed that enhanced the already popular SMS. The Multi-media Messaging Service ("MMS") can transmit messages containing text, graphics, photographic images, audio and even video clips between mobile devices using Wireless Application Protocol ("WAP") and powered by new high-speed transmission technologies such as Enhanced Data rate for GSM Evolution ("EDGE") and General Packet Radio Service ("GPRS"). MMS provides further possibilities in the latest technical gadgetry. What is needed, however, is a mechanism to integrate MMS into those areas of mobile communications with which wireless device users are most currently familiar, such as traditional mobile voice calls.

SUMMARY OF THE INVENTION

The above-identified problems are solved and a technical advance is achieved in the art by systems and methods for providing multimedia messaging service (MMS) ringing images on mobile calls. In one embodiment, a ringing image comprises a combination of sound and images/video with textual information.

An exemplary method for providing MMS ringing images on mobile calls includes: receiving a ringing image request message including an address of a terminating mobile station and a URL address; retrieving ringing image data, including image data and ring tone data, located at the URL address; creating a multimedia message service (MMS) message containing the ringing image data; and sending the MMS message to the terminating mobile station. In one embodiment, the MMS message preferably is sent substantially simultaneously with call setup information.

In an alternate embodiment, directed to a method for a mobile terminal to provide multimedia messaging service (MMS) ringing images on mobile calls an exemplary method includes: receiving an incoming call from an originating mobile station; receiving an MMS message associated with the incoming call, wherein the MMS message contains ringing image data including image data and ring tone data; presenting the ringing image data to a user of the terminating mobile station; and in response to presentation of the ringing image data, receiving an indication from the user to answer the incoming call.

In an alternate embodiment, an exemplary method includes: creating a call setup message including an address of a terminating mobile station and an identifier of ringing image data; sending the call set up message to a mobile switching center to initiate a call to the terminating mobile station and transmission of a ringing image message comprising the ringing image data to the terminating mobile station; and upon answering of the call by a user of the terminating mobile station in response to presentation of the ringing image data, conducting the call with the user of the terminating mobile station.

Other and further aspects of the present invention will become apparent during the course of the following description and by reference to the attached drawings.

BRIEF DESCRIPTION OF THE DRAWINGS

FIG. 2A is a block diagram illustrating an exemplary ringing image call set-up message in accordance with one embodiment of the present invention.

FIG. 2B is a block diagram illustrating an exemplary ringing image request message in accordance with one embodiment of the present invention.

FIG. 2C is a block diagram illustrating an exemplary ringing image message in accordance with one embodiment of the present invention.

DETAILED DESCRIPTION

In the following description of the various embodiments, reference is made to the accompanying drawings which form a part hereof, and in which are shown by way of illustration various embodiments in which the invention may be practiced. It is to be understood that other embodiments may be utilized and structural and functional modifications may be made without departing from the scope of the present invention.

Figure 1:
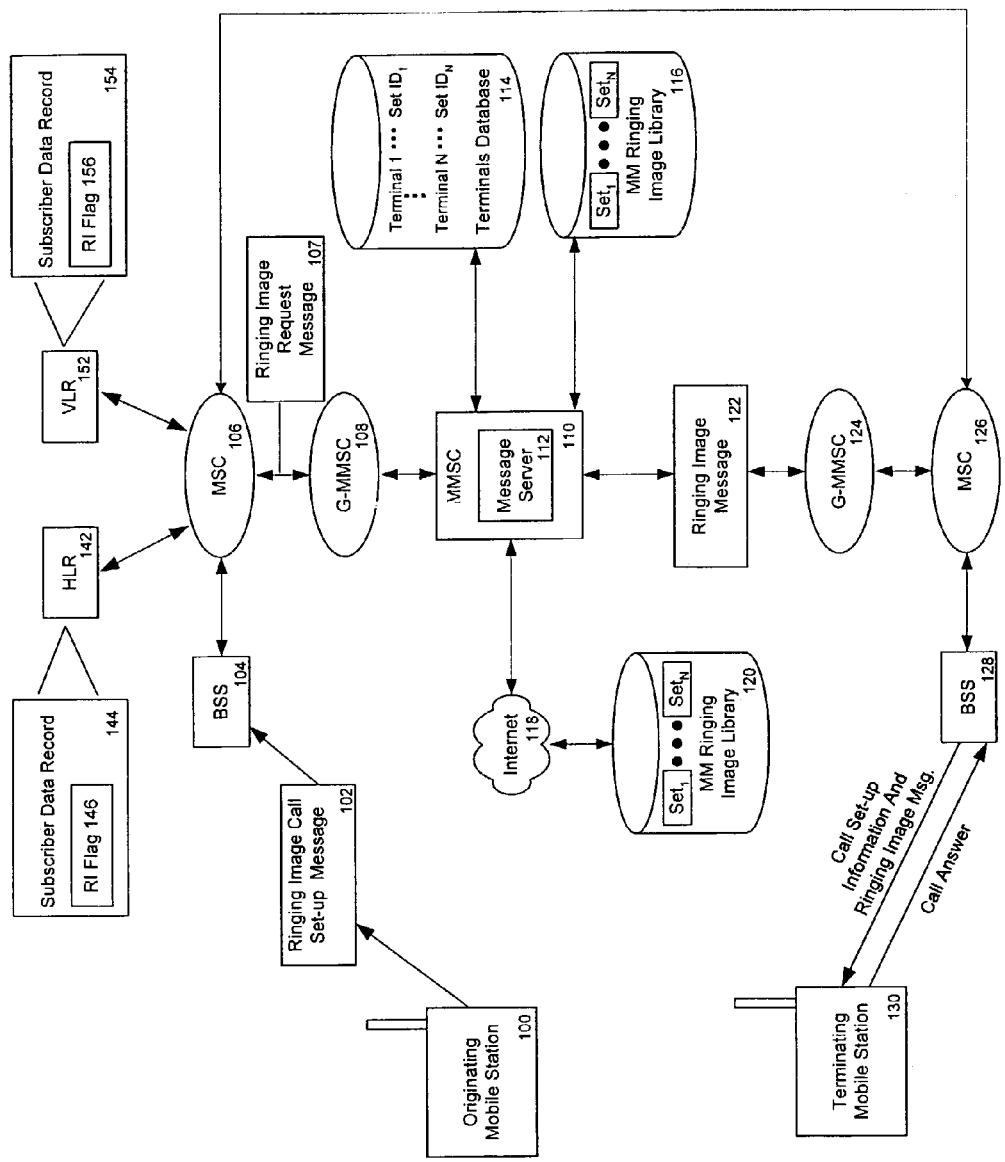
FIG. 1 is a block diagram illustrating an exemplary network environment in which a mobile station may be used for conducting ringing image calls in accordance with one embodiment of the present invention.

Referring now to the drawings, wherein like reference numerals refer to like parts, FIG. 1 is a block diagram illustrating an exemplary network environment in which mobile stations may conduct ringing image calls in accordance with one embodiment of the present invention. As shown in FIG. 1, an originating mobile station 100 and a terminating mobile station 130 are shown in communication with a mobile communications network such as GSM, EDGE or Universal Mobile Telecommunications Service ("UMTS"). Mobile stations 100/130 may be mobile handsets such as mobile phones, personal digital assistants ("PDAs") or the like, or portable computers such as laptops, having wireless voice and data capabilities. In accordance with one embodiment of the present invention, when a user of originating mobile station 100 desires to call a user of terminating mobile station 130, he or she instructs mobile station 100 to send a ringing image call set-up message 102 to a mobile switching center (MSC) 106 via a base station system (BSS) 104 to request that a ringing image message 122 be transmitted to terminating mobile station 130 in connection with call establishment. As will be discussed in detail hereinafter, a ringing image message 122 comprises multimedia content or ringing image data (e.g., a combination of sound and images/video with text and an optional presentation format) that is presented to the user of the terminating mobile station 130 in connection with a call from the originating mobile station 100. The user of terminating mobile station 130 may answer the call (e.g., by depressing a predetermined key on terminating mobile station 130) thereby discontinuing the presentation of the ringing image data.

An exemplary ringing image call set-up message 102 generated by originating mobile station 100 to initiate call establishment is illustrated in FIG. 2A. As shown therein, message 102 comprises a header 201a that includes a field 202 for an address of a terminating mobile station 103 and a body 201b that includes fields (204, 206) for a ringing image identifier and an address of the originating mobile station 100, respectively. The addresses of the terminating and originating mobile stations in fields 202 and 206 may be, but are not intended to be limited to, MSISDNs. Also, the ringing image identifier in field 204 may be a URL or a URI, which, for purposes of the present invention, are equivalent to one another and may be referred to collectively herein as simply a URL.

In one embodiment, the ringing image identifier may be specified by the originating mobile station 100. For example, a ringing image identifier may be selected by the user of the originating mobile station 100 from a plurality of ringing image identifiers stored in station 100 and transmitted as part of the ringing image call setup message 102. As will be discussed in detail hereinafter, each ringing image identifier stored in mobile station 100 corresponds to a ringing image in a set of ringing images stored within multimedia messaging service center (MMSC) 110. Each originating mobile station 100 (or each user thereof) preferably has a set of ringing images stored within MMSC 110. The set may be stored and linked to mobile station 100 (or a user thereof) at the time the user either purchases mobile station 100 or subscribes to the ringing image service. Preferably, the user may also modify, add or remove ringing images from the initially provided set.

Rather than the user selecting a ringing image identifier, in one embodiment, mobile station 100 or even an entity in the network such as MMSC 110 may select an identifier based upon predetermined criteria having been satisfied. For example, user selection of a frequently dialed number may result in the automatic selection of a ringing image identifier corresponding to an informal ringing image, such as the user's photograph with a personal audio message. In contrast, selection of an infrequently dialed number may result in selection of an identifier corresponding to a formal ringing image such as a firm's logo and its ring tone. In yet an alternate embodiment, selection of a ringing image identifier may be based on the originating mobile station 100's number and be either company-specific (e.g., a Nokia ringing image on all calls made by Nokia employees) or operator-specific (particularly in markets where operators subsidize mobile stations). It will be understood that if the network selects the ringing image identifier, rather than mobile station 100, an identifier would not be included in the ringing image call set-up message 102.

In one embodiment, upon receipt of a ringing image call set-up message 102, MSC 106 uses the originating mobile station address contained therein to retrieve a subscriber data record (144, 154) corresponding to that address from a subscription record node, which may be, e.g., either a home location register (HLR) 142 or a visitor location register (VLR) 152 shown in FIG. 1. As is well know in the art, the HLR is the main data base of permanent subscriber information for a mobile network holding pertinent user information, including address, account status, preferences, subscriptions, etc. Similarly, the VLR maintains temporary user information to manage call requests from subscribers who are out of the coverage area covered by their home system. If the originating mobile station 100 subscribes to the ringing image feature, the subscriber record (144, 154) will preferably contain a flag (146, 156) indicating the subscription. Upon receipt of such a subscriber record from either data base, MSC 106 will establish a call to the terminating mobile station 130 and will also create a ringing image request message 107 for transmission to a multimedia messaging service center (MMSC) 110.

FIG. 2B illustrates an exemplary ringing image request message 107. As shown therein, message 107 comprises a header 208a that includes a field 210 for an address of a multimedia messaging service center (MMSC) 110 and a body 208b that includes fields (220, 222, 224) for the terminating mobile station's number, the ringing image identifier and the originating mobile station's number. Request message 107 may also include a ringing image request flag (not shown) for use by MMSC 110 in distinguishing ringing image request messages from other MMS-related messages that it receives.

Once a ringing image request message 107 has been generated by MSC 106, it is transmitted to MMSC 110 via multimedia messaging service center gateway ("G-MMSC") 108 of the mobile communications network. MMSC 110 relays the ringing image request message 107 to message server 112 for processing of the request. In this regard, as shown in FIG. 1, message server 112 is preferably coupled to both a terminals data base 114 and a multimedia ringing image library 116. Terminals data base 114 stores a list of mobile stations that have subscribed to the ringing image service and, for each mobile station, contains an identifier corresponding to a set of one or more ringing images for that mobile station. Multimedia ringing image library 116, in turn, stores each mobile station's set of ringing images.

In one embodiment, upon receiving ringing image request message 107 from MMSC 110, message server 112 extracts the ringing image identifier and the originating mobile station 100's number from fields 222 and 224, respectively, for use in retrieving a ringing image from multimedia ringing images library 116. In particular, message server 112 uses the originating mobile station 100's number to determine, from terminals data base 114, a ringing image set identifier for that mobile station. Server 112 then uses the set identifier to access originating mobile station 100's set of ringing images from multimedia ringing images library 116. Finally, server 112 uses the ringing image identifier extracted from request message 102 to retrieve from the set the particular ringing image to be sent to terminating mobile station 130. As previously mentioned, each ringing image may include data comprising a combination of sound and images/video coupled with text together with a format for presenting such multimedia to the user. In an alternate embodiment, the originating mobile station 100's set identifier may point to a location in a data network, such as Internet 118 shown in FIG. 1, where a remote ringing image library 120 and ringing image sets stored therein are maintained by a third party and from which message server 112 may retrieve ringing images.

Once the ringing image data has been retrieved from the appropriate library (116, 120), message server 112 generates a MMS ringing image message 122 containing the ringing image data for delivery to terminating mobile station 130. As shown in FIG. 2C, an exemplary ringing image message 122 comprises a header 252a that includes fields (260, 262, 264) for a terminating mobile station's address, a ringing image flag and the originating mobile station's address. The ringing image message 122 also comprises a body 252b that includes fields (270, 272, 276, 278) for the ringing image data such as a presentation format, images/videos, audio and text.

Once the ringing image message 122 has been generated by message server 112, it is transmitted to terminating mobile station 130 via a multimedia messaging service center gateway ("G-MMSC") 124, mobile switching center ("MSC") 126 and base station system ("BSS") 128 of the mobile communications network. In one embodiment, call setup information is sent through the mobile communications network substantially simultaneously with the ringing image message 122, and thus, is received by terminating mobile station 130 substantially simultaneously. The terminating mobile station 130 may identify both the call setup information (e.g., a page message corresponding to the call placed by the originating mobile station 100) and the ringing image message as being associated with a ringing image call by ringing image flags contained in both messages and may each be linked to one another by the originating mobile station 100's MSISDN. In one embodiment, upon receipt of the ringing image message 122, terminating mobile station 130 presents the ringing image data to the user. After receiving an indication from the user (e.g., depression of a predetermined key) to answer the incoming call linked with the ringing image message 122, terminating mobile station 130 substantially simultaneously switches from presenting the ringing image data to conducting the call.

Figure 3:
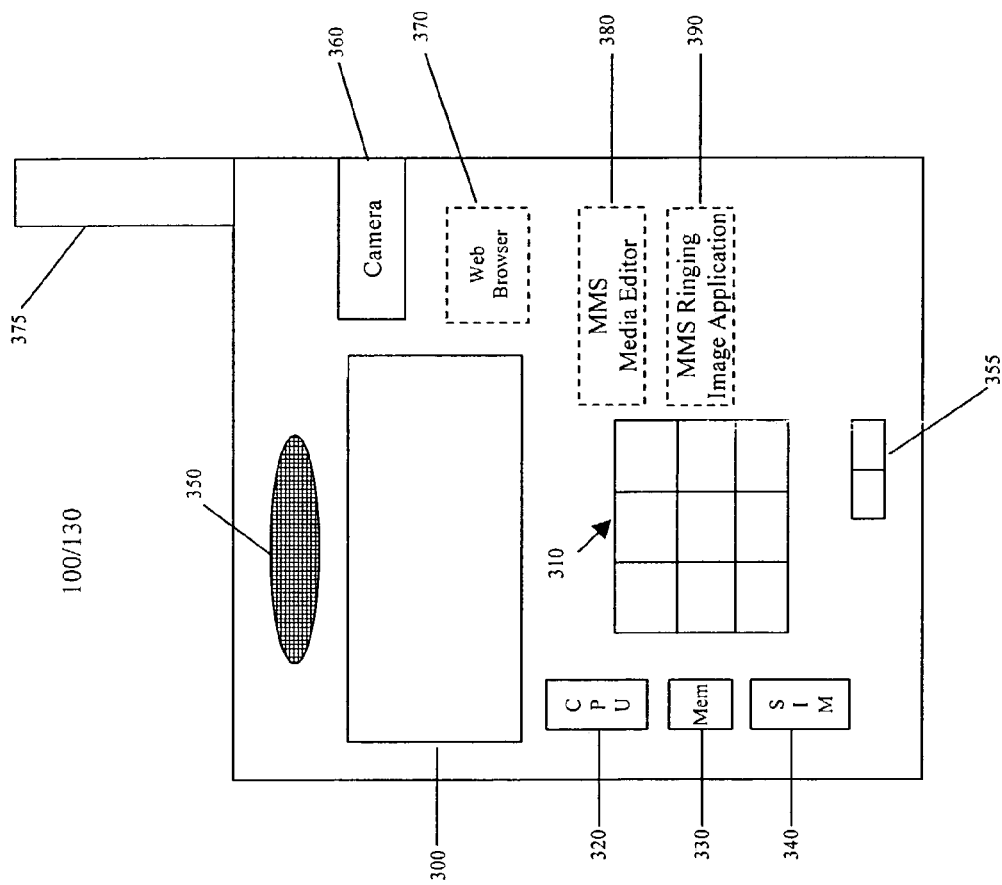
FIG. 3 is a block diagram of a mobile station for use in the exemplary network environment shown in FIG. 1.

FIG. 3 is a block diagram of a mobile station for use in the exemplary network environment shown in FIG. 1. The mobile station shown in FIG. 3 may be both the originating mobile station 100 and the terminating mobile station 130. The mobile station 100/130 preferably comprises a display 300, a plurality of keys 310, a speaker 350, a microphone 355, a camera 360 and an antennae 375. Mobile station 100/130 is also preferably equipped with a web browser 370 for downloading and viewing hypertext media content and a MMS editor 380 for creating, displaying and editing MMS service messages.

As further shown in FIG. 3, mobile station 100/130 also includes a central processing unit ("CPU") 320 together with memory 330 and a subscriber identity module ("SIM") 240. Memory 230 and SIM 240 may provide storage for programs and/or data including a MMS ringing image application 390 for performing a variety of functions in accordance with the present invention including generating ringing image call setup messages 102 for transmission to MSC 106 and processing ringing image messages 122 received from message server 112 together with linked incoming calls. In one embodiment, the ringing image application 390 also enables the user to create ringing images for addition to a ringing image set stored at MMSC 110. Such ringing images may be created, e.g., from data files downloaded from a data network such as the Internet 118 using web browser 130 and/or data files generated locally by mobile station 100/130 using one or more of input keys 310, microphone 355 and camera 360.

Figure 4:
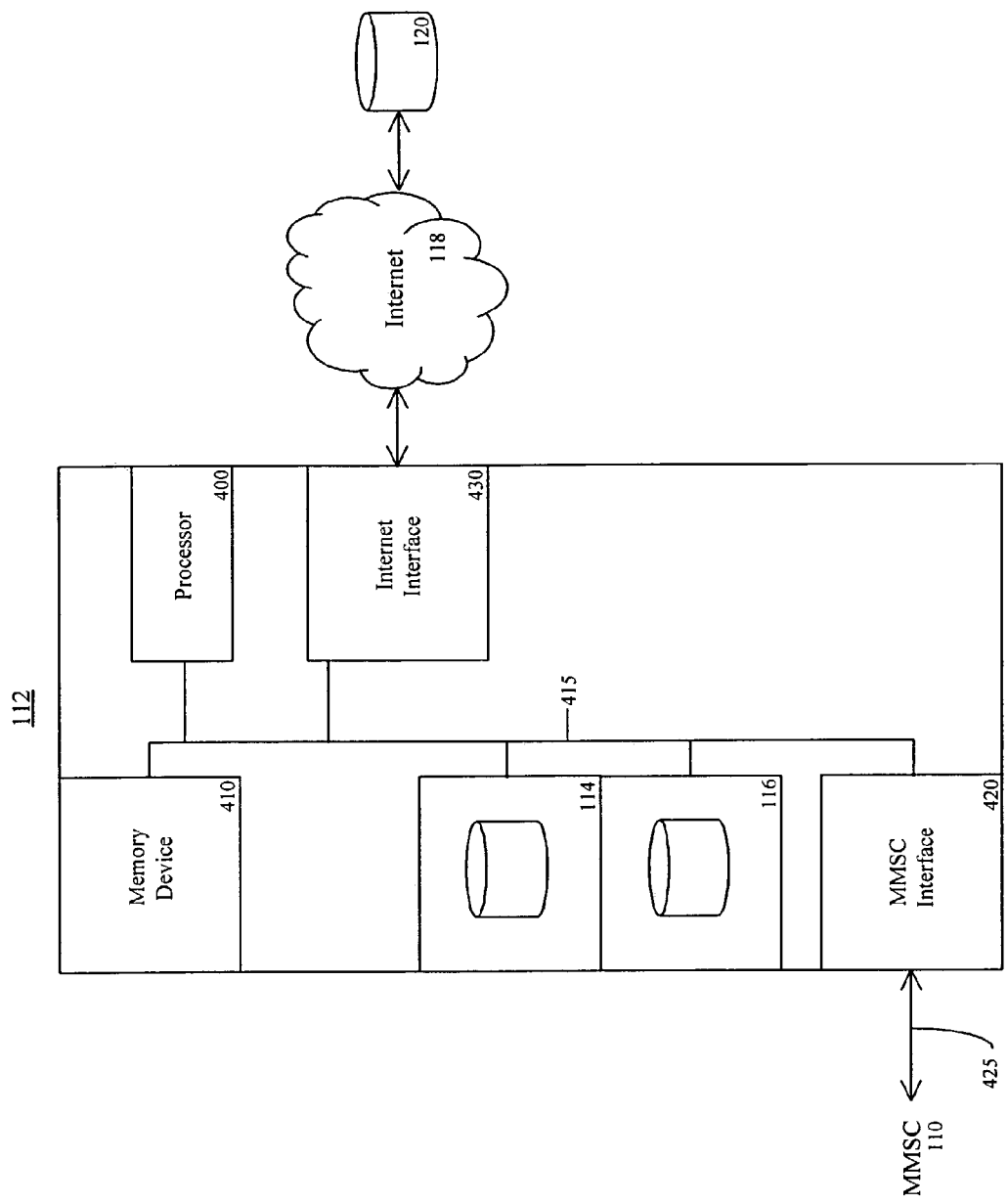
FIG. 4 is a block diagram of a MMS message server for use in the exemplary network environment shown in FIG. 1.

FIG. 4 is a block diagram of a MMS message server 112 for use in the exemplary network environment shown in FIG. 1. As shown in FIG. 4, message server 112 comprises a processor 400 and memory 410 interconnected to various system components by a system bus 415. These system components include an MMSC interface 420 for receiving ringing image request messages 107 from, and transmitting ringing image messages 122 to, MMSC 110 via an MMSC link 425. In the embodiment shown in FIG. 4, message server also includes terminals data base 114 and ringing image library 116 for use in retrieving ringing image data to generate ringing image messages 122 for transmission to terminating mobile station 130, as will be discussed in detail hereinafter in connection with FIG. 7. Message server 112 further comprises an Internet interface 430 connected to the Internet 118 via a high-speed backbone for retrieving ringing image data from third-parties.

Figure 5:
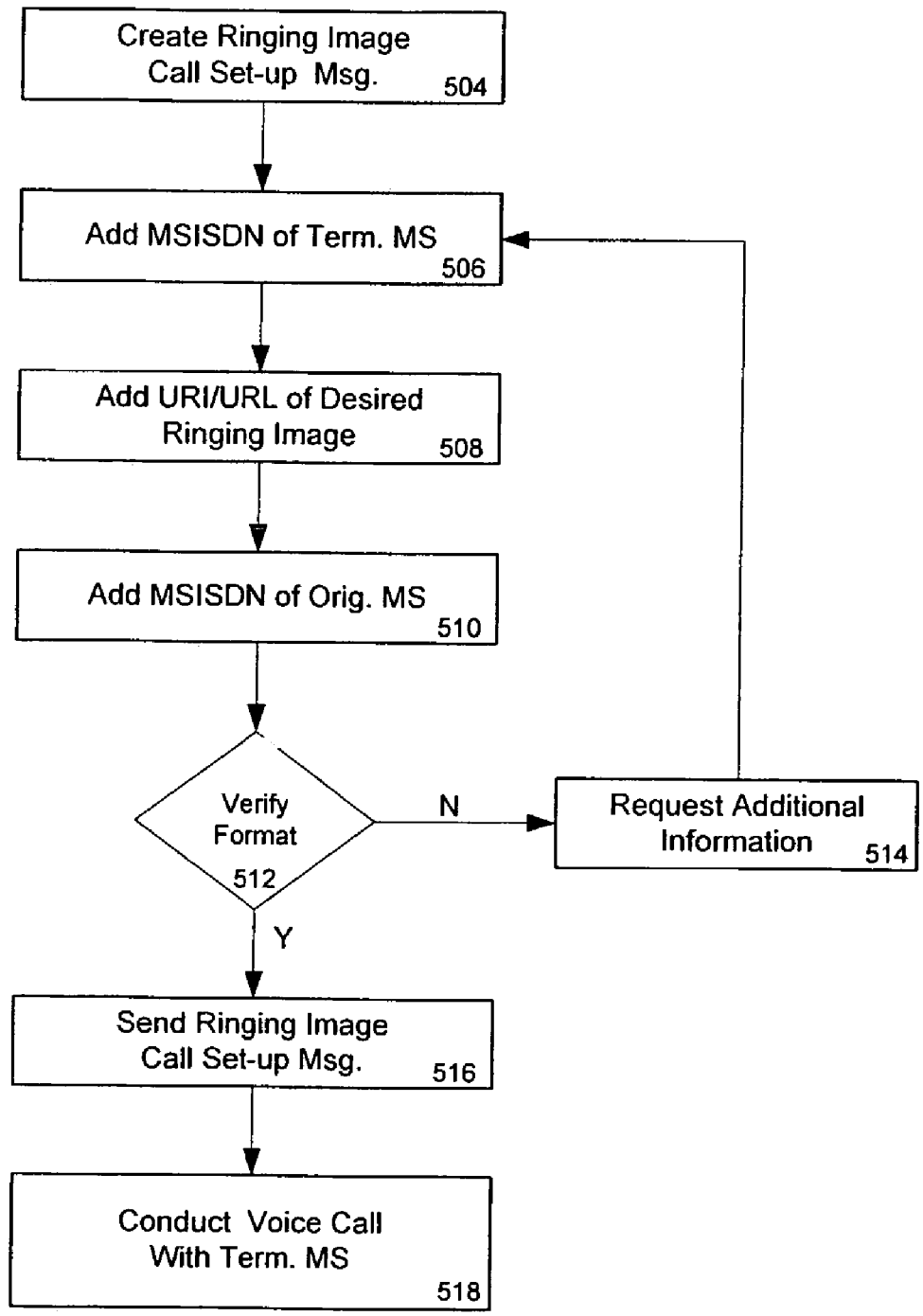
FIG. 5 is a flowchart illustrating an exemplary process by which an originating mobile station generates a ringing image request message in accordance with one embodiment of the present invention.

FIG. 5 is a flowchart illustrating an exemplary process by which an originating mobile station generates a ringing image call setup message 102 in accordance with one embodiment of the present invention. In step 504, a ringing image call setup message 102 is created. In steps 506–510, the header 201a of message 102 is populated with the MSISDN of the terminating mobile station 130 and the body 201b is populated with the URL/URI of the desired ringing image and the MSISDN of the originating mobile station. In one embodiment, the user of originating mobile station 100 is prompted for the terminating mobile station 130's MSISDN and the URL/URI of the ringing image for addition to the ringing call set-up message 102 in steps 506 and 508, respectively. In step 512, MMS ringing image application 390 determines whether or not the MSISDN and the URL/URI entered by the user are in an acceptable format. If either one is not in an acceptable format, then, in step 514, additional information needed to correct the MSISDN and/or the URL/URI is requested from the user. If both the MSISDN and the URL/URI are in an acceptable format then, in step 516, the ringing image call set-up message 102 is sent to MSC 106. If, in response to receipt of call set-up information (e.g., a page message) and the ringing image message 122 transmitted by the MMSC 110, a user of terminating mobile station 130 answered the call corresponding to the call set up message 102 then, in step 518, a user of originating mobile station 100 can communicate with the user of terminating mobile station 130.

Figure 6A:
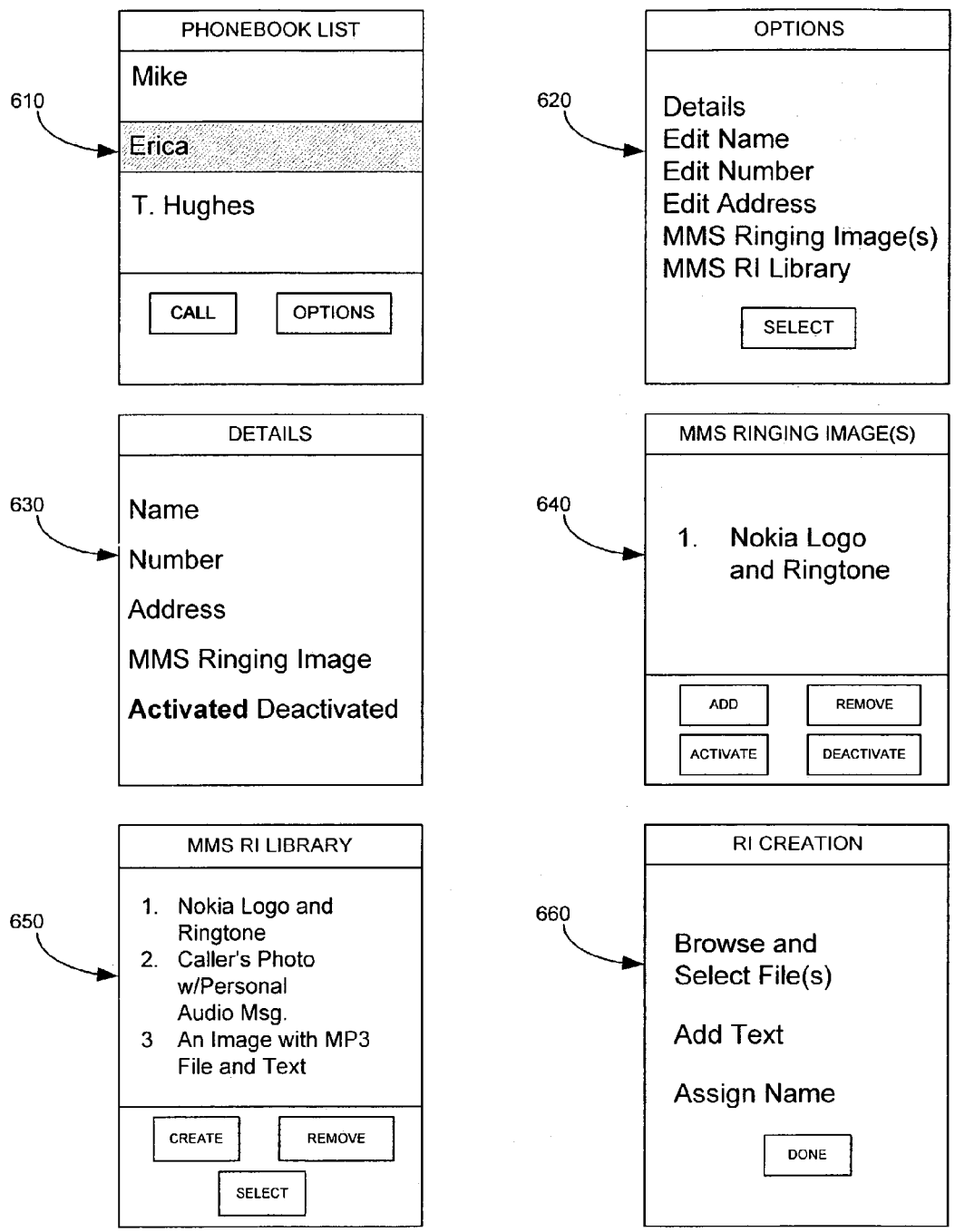
FIG. 6A is a block diagram illustrating various screenshots of exemplary options available to a user of an originating mobile station that initiates a MMS ringing image request message in accordance with one embodiment of the present invention.

FIG. 6A is a block diagram illustrating various user interfaces or screenshots of exemplary options available to a user of an originating mobile station 100 that initiates transmission of a ringing image call set-up message 102 in accordance with one embodiment of the present invention. As illustrated in screen 610 of FIG. 6A, a user's electronic phonebook residing on originating mobile station 100 contains one or more entries, each of which is associated with a terminating mobile station 130. If a MMS ringing image has been activated for an entry, a ringing image call setup message 102 may be initiated by scrolling to, and thus highlighting, the entry and pressing the "call" button. If a ringing image has not yet been activated for the entry, pressing the call button will result in the transmission of a conventional call setup message without any ringing image identifier.

Pressing the "options" button on screen 610 results in screen 620, which lists the options available to the user vis-a-vis the highlighted phonebook entry. Scrolling to "details" and pressing the "select" button results in screen 630, which shows the details associated with the highlighted phonebook entry. In addition to other information relating to this phonebook entry, these details include an indication of whether or not a MMS ringing image is activated. As mentioned above, if activated, scrolling to this phonebook entry in screen 610 and depressing the "call" button will result in the transmission of a ringing image call setup message 102 to MSC 106.

Returning to screen 620, scrolling to "MMS Ringing Image" and depressing the "select" button results in screen 640, which shows the ringing images currently available for the highlighted phonebook entry. From screen 640, a user can scroll to one of the ringing images and either activate or deactivate it or remove it from the list. In one embodiment, more than one ringing image may be selected for activation.

Depressing the "add" button on screen 640, results in screen 650, which displays the originating mobile station 100's MMS ringing images library and lists all ringing images that are currently available for association with a phonebook entry. Scrolling to one of the ringing images in the library and depressing the "select" button on screen 650 results in the addition of the selected ringing image to the list of ringing images displayed on screen 640 for a particular phonebook entry. Also, a user can remove one or more of the ringing images from the library to make room if need be for other ringing images by scrolling to a ringing image and depressing the "remove" button.

Figure 6B:
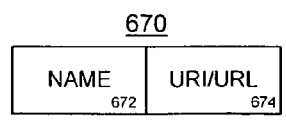
FIG. 6B is a block diagram illustrating a record for a MMS ringing image for use in the exemplary mobile station shown in FIG. 3.

In one embodiment, depressing the "create" button from screen 650, results in screen 660, which shows some options available to the user during the process of creating a ringing image. These options may include browsing and selecting one or more files such as audio, images/video, text, etc., adding text using input keys 310 of originating mobile station 100 and assigning a name to the ringing image. Upon creation of a ringing image, originating mobile station 100 transmits it to MMSC 110 for addition to station 100's ringing image set and, in return, receives a URL/URI indicating the location of the ringing image from MMSC 110. Mobile station 100 then creates a record 670 for the ringing image, as shown in FIG. 6B, comprising the name 672 assigned by the user and the URL/URI 674 received from MMSC 110. Thereafter, the name of the newly added ringing image appears in ringing image library whenever screen 650 is displayed. Originating mobile station 100, having stored the ringing image data in MMSC 110, may then delete this data from memory 330 to conserve its own resources.

Figure 7:
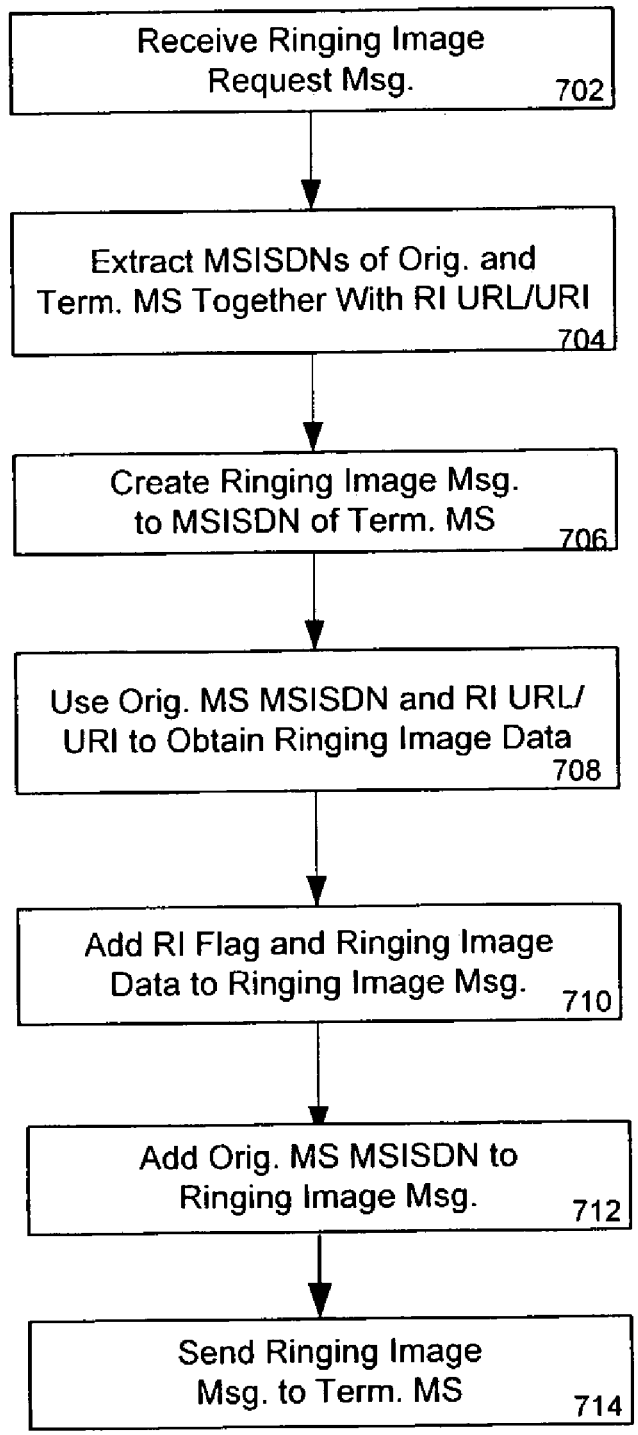
FIG. 7 is a flowchart illustrating an exemplary process by which a MMS message server generates a MMS ringing image message in accordance with one embodiment of the present invention.

FIG. 7 is a flowchart illustrating an exemplary process by which a MMS message server 112 generates a MMS ringing image message 122 in accordance with one embodiment of the present invention.

In step 702, message server 112 receives a ringing image request message 107 from MSC 106 via MMSC 110. In step 704, server 112 extracts the MSISDNs (220, 224) of the terminating and originating mobile stations together with the ringing image identifier 222 from message 107. In step 706, server 112 creates a ringing image message 122 addressed to the MSISDN of the terminating mobile station 103. In step 708, server 112 retrieves ringing image data for inclusion in message 122. In particular, in one embodiment, message server 112 uses the MSISDN of the originating mobile station 100 to retrieve a ringing image set identifier for that station from terminals data base 114. Server 112 then uses the set identifier retrieved from data base 114 to access the corresponding set of ringing images from multimedia ringing images library 116 and select from that set the ringing image data corresponding to the ringing image identifier extracted from request message 107.

In step 710, message server 112 adds the ringing image data to the ringing image message 122. A ringing image flag is also included in field 262 of message 122 to assist the terminating mobile station 130 in identifying the message as one in need of ringing image processing in accordance with the present invention. In step 712, message server 112 also adds the MSISDN of the originating mobile station 100 to the ringing image message 122 for use by the terminating mobile station 130 in linking message 122 with the incoming mobile call from the originating mobile station 100. In step 714, message server 112 sends the ringing image message 122 to the terminating mobile station 130 via G-MMSC 124, MSC 126 and BSS 128 of the mobile communications network.

Figure 8:
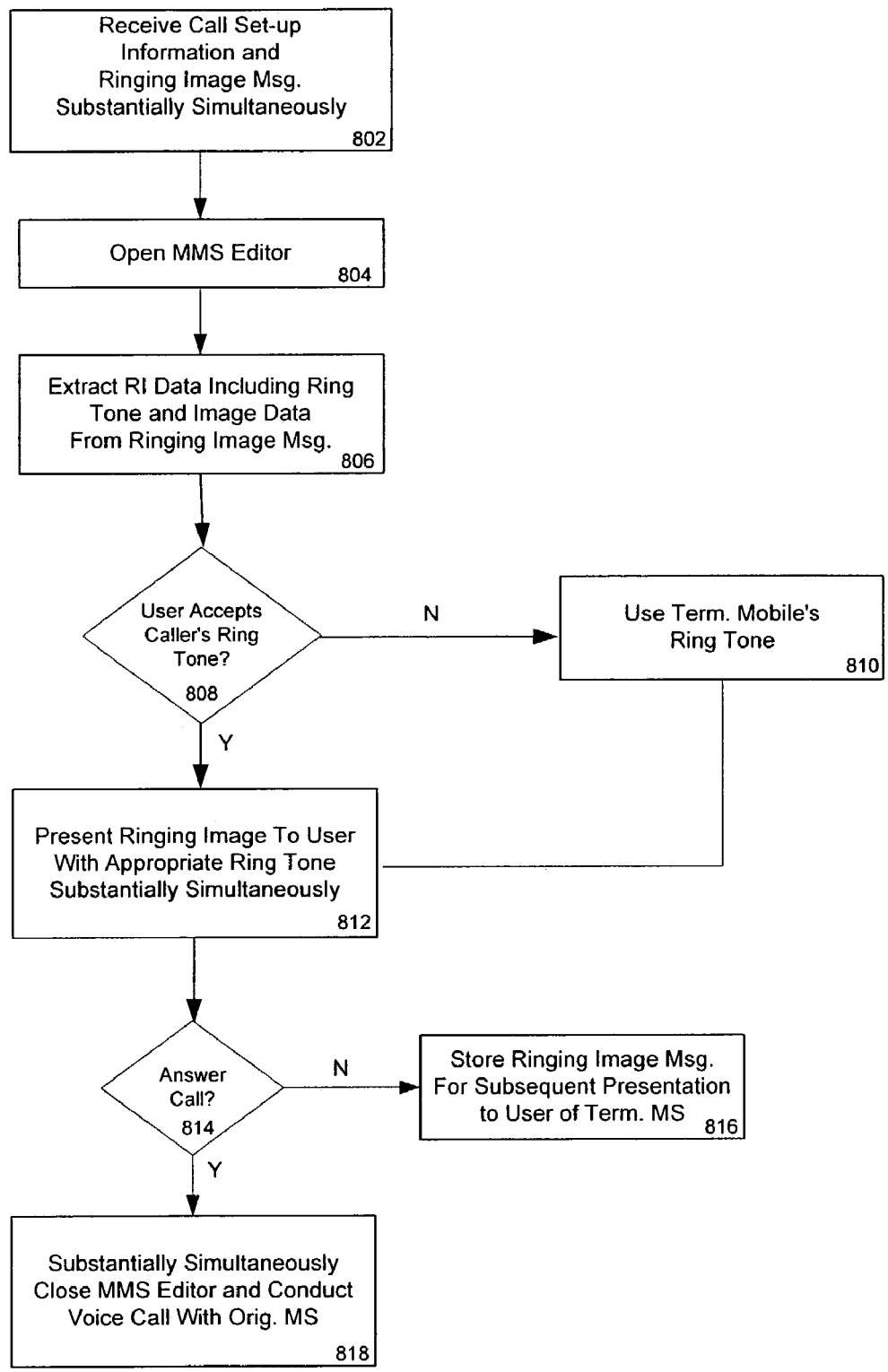
FIG. 8 is a flowchart illustrating an exemplary process by which a terminating mobile station receives a MMS ringing image message in accordance with one embodiment of the present invention.

FIG. 8 is a flowchart illustrating an exemplary process by which a terminating mobile station receives a MMS ringing image message 122 in accordance with one embodiment of the present invention.

In step 802, terminating mobile station 130 receives call setup information (e.g., a page message containing caller information such as the originating mobile station address or MSISDN) and a ringing image message 122 from BSS 128. The ringing image message 122 may be distinguished from other types of MMS messages by the ringing image flag in field 262 of the message. The call setup information may also include a similar-flag which, together with the originating mobile station address in both the page message and the ringing image message 122, may be used to link the incoming call with the ringing image message 122.

In step 804, MMS editor 380 is opened and, in step 806, the ringing image data including the ring tone data and image data is extracted from the ringing image message 122 for presentation to the user. In step 808, a determination is made as to whether the user accepts the ring tone data extracted from the ringing image message 122 for presentation on mobile station 130. Acceptance may be determined by prompting the user and receiving a response therefrom or by accessing a user profile stored in terminal 130 from which user acceptance may be derived. For example, the profile may suggest usage of a ring tone that is pre-stored in mobile station 130 in lieu of the ring tone contained in the ringing image message 122. Alternatively, if the profile is "silent", then the ringing image data may not be presented to the user of station 130.

If the ring tone is not accepted then, in step 810, one of the mobile station 130's pre-stored ring tones may be used instead. In step 812, the ringing image is presented to the user of mobile station 130 substantially simultaneously with the appropriate ring tone (i.e., either the ring tone extracted from the ringing image message 122 or a pre-stored ring tone).

In step 814, a determination is made as to whether the user has answered the incoming call associated with the ringing image message 122. If the user does not answer the call then, in step 816, the ringing image message 122 is stored in memory 330 of terminating mobile station 130 for subsequent presentation to the user. The ringing image 122 may also be stored for later presentation in the event that mobile station 130's profile is such that the data may not be presented to the user at the time it is received. If, however, the user answers the call then, in step 818, the MMS media editor 380 is closed substantially simultaneously with the answering of the call.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims. For example, references made herein to multimedia messaging service (MMS) are intended to be exemplary rather than limiting, and the present invention is applicable to other similar messaging services.

I claim:

1. A method for providing mobile terminals with multimedia messaging service (MMS) ringing images on mobile calls, comprising:
   receiving a ringing image request message including an address of a mobile station;
   if the address is an address of a first type, retrieving a first ringing image data, including a first image data and a first ring tone data;
   if the address is an address of a second type, retrieving a second ringing image data, including a second image data and a second ring tone data;
   creating a multimedia message service (MMS) message containing the retrieved ringing image data; and
   sending the MMS message to a terminating mobile station.

2. The method of claim 1 wherein ringing image request message is received from an originating mobile station and an address of a first type is an address to which the originating mobile station frequently initiates a communication.

3. The method of claim 1 wherein the first ringing image data corresponds to an informal ringing image and the second ringing image data corresponds to a formal ringing image.

4. A method for a station to provide ringing images on calls, comprising:
   receiving an incoming call from an originating station;
   receiving a message associated with the incoming call, wherein the message contains ringing image data including image data and ring tone data;
   presenting the ringing image data to a user of the terminating station using a presentation application;
   in response to presentation of the ringing image data, receiving an indication from the user to answer the incoming call; and
   upon answering the incoming call, terminating presentation of the ringing image data by closing the presentation application.

5. The method of claim 4 wherein the incoming call and the message are received substantially simultaneously.

6. The method of claim 4, wherein terminating presentation of the ringing image data occurs substantially simultaneously upon answering of the incoming call.

7. The method of claim 4 wherein the image data comprises video data.

8. The method of claim 4 wherein presenting the ringing image data comprises presenting both the ring tone data and the image data.

9. The method of claim 4 further comprising:
in the event that the indication is not received from the user, storing the message for subsequent presentation.

10. The method of claim 4 wherein the ringing image data is presented to the user of the terminating station in accordance with a profile of the terminating station.

11. The method of claim 10 further comprising:
if the profile does not permit presentation of the ringing image data to the user of the terminating station, then storing the ringing image data in the terminating station until presentation is permitted.

12. The method of claim 4 wherein the terminating station is a mobile station and the message is a multimedia messaging service (MMS) message.

13. The method of claim 4 wherein the presentation application is an editor.

14. A method for a station to provide ringing images on calls, comprising:
pre-storing ring tone data;
receiving an incoming call from an originating station;
receiving a message associated with the incoming call, wherein the message contains ringing image data including image data and ring tone data;
determining whether to present ring tone data contained in the message or the pre-stored ring tone data;
presenting the image data and the pre-stored ring tone data in lieu of the ring tone data contained in the message; and
in response to presentation of the image data and the pre-stored ring tone data, receiving an indication from the user to answer the incoming call.

15. The method of claim 14 wherein the pre-stored ring tone data is presented substantially simultaneously with image data contained in the message.

16. The method of claim 14 wherein determining whether to present ring tone data contained in the message or the pre-stored ring tone data is based on user input.

17. The method of claim 16 further comprising:
prompting the user for an indication to present the ring tone data contained in the message.

18. The method of claim 14 wherein determining whether to present ring tone data contained in the message or the pre-stored ring tone data is based on information in a user profile.

19. The method of claim 14 wherein the terminating station is a mobile station and the message is a multimedia messaging service (MMS) message.

20. A method for a station to provide ringing images on calls, comprising:
receiving, from a user of the station, an identification of a terminating station to be called and a selection of a ringing image identifier, from a plurality of ringing image identifiers, corresponding to ringing image data to be sent to the terminating station in connection with the call;
creating, in the station, a call setup message including an address of the terminating station and the identifier of the ringing image data;
sending the call set up message to a center to initiate a call to the terminating station and transmission of a ringing image message comprising the ringing image data to the terminating station; and
upon answering of the call by a user of the terminating station in response to presentation of the ringing image data, conducting the call with the user of the terminating station.

21. The method of claim 20 wherein call initiation and transmission of a ringing image message occur substantially simultaneously.

22. The method of claim 20 further comprising:
upon answering of the call by a user of the terminating station, substantially simultaneously switching from MMS communication to voice communication.

23. The method of claim 20 further comprising:
creating a ringing image;
transmitting the ringing image to a remote location for storage.

24. The method of claim 23 wherein the remote location is a multimedia message service (MMS) center.

25. The method of claim 23 wherein creating a ringing image comprises:
adding image and audio files.

26. The method of claim 23 wherein creating a ringing image further comprises:
adding text information.

27. The method of claim 23 wherein creating a ringing image further comprises:
adding a presentation format.

28. The method of claim 23 further comprising:
receiving an identifier for the ringing image;
storing the identifier in the originating station.

29. The method of claim 20 wherein the terminating station is a mobile station and the ringing images are multimedia messaging service (MMS) ringing images.

30. A station, for providing ringing images on calls, comprising:
a memory device for storing a program; and
a processor in communication with the memory device, the processor operative with the program to:
receive an incoming call from an originating station;
receive a message associated with the incoming call, wherein the message contains ringing image data including image data and ring tone data;
present the ringing image data to a user of the terminating station using a presentation application;
in response to presentation of the ringing image data, receive an indication from the user to answer the incoming call; and
upon answering the incoming call, terminate presentation of the ringing image data by closing the presentation application.

31. The station of claim 30 wherein the incoming call and the message are received substantially simultaneously.

32. The station of claim 30, wherein the station is a mobile telephone.

33. The station of claim 30 wherein the processor is further operative with the program to:
terminate presentation of the ringing image data substantially simultaneously with answering of the incoming call.

34. The station of claim 30 wherein the ringing image data further comprises textual information.

35. The station of claim 30 wherein the originating and terminating stations are mobile stations and the message containing the ringing image data is a multimedia messaging service (MMS) message.

36. The system of claim 30 wherein the presentation application is an editor.

37. A station, for providing ringing images on calls, comprising:
- a memory device for storing a program; and
- a processor in communication with the memory device, the processor operative with the program to:
- receive, from a user of the station, an identification of a terminating station to be called and a selection of a ringing image identifier, from a plurality of ringing image identifiers, corresponding to ringing image data to be sent to the terminating station in connection with the call;
- create, in the station, a call setup message including an address of the terminating station and the identifier of ringing image data;
- send the call set up message to a center to initiate a call to the terminating station and transmission of a ringing image message comprising the ringing image data to the terminating station; and
- upon answering of the call by a user of the terminating station in response to presentation of the ringing image data, conduct the call with the user of the terminating station.

38. The station of claim 37 wherein initiating a call comprises transmitting call setup information through a mobile communications network to establish a call to the terminating station.

39. The station of claim 38 wherein call initiation and transmission of a ringing image message occur substantially simultaneously.

40. The station of claim 37 wherein the terminating station is a mobile station, the center is a mobile switching center and the ringing images are multimedia messaging service (MMS) ringing images.

41. A system for providing multimedia messaging service (MMS) ringing images on mobile calls, comprising:
- a memory device for storing a program; and
- a processor in communication with the memory device, the processor operative with the program to:
- receive a ringing image request message including an address of a mobile station;
- if the address is an address of a first type, retrieve a first ringing image data, including a first image data and a first ring tone data;
- if the address is an address of a second type, retrieve a second ringing image data, including a second image data and a second ring tone data;
- create a multimedia message service (MMS) message containing the retrieved ringing image data; and
- send the MMS message to a terminating mobile station.

42. The system of claim 41 wherein ringing image request message is received from an originating mobile station and an address of a first type is an address to which the originating mobile station frequently initiates a communication.

43. The system of claim 41 wherein the first ringing image data corresponds to an informal ringing image and the second ringing image data corresponds to a formal ringing image.

44. A station, for providing ringing images on calls, comprising:
- a memory device for storing a program; and
- a processor in communication with the memory device, the processor operative with the program to:
- pre-store ring tone data;
- receive an incoming call from an originating station;
- receive a message associated with the incoming call, wherein the message contains ringing image data including image data and ring tone data;
- determine whether to present ring tone data contained in the message or the pre-stored ring tone data;
- present the image data and the pre-stored ring tone data in lieu of the ring tone data contained in the message; and
- in response to presenting the image data and the pre-stored ring tone data, receive an indication from the user to answer the incoming call.

45. A system for providing ringing images on calls, comprising:
- a memory device for storing a program; and
- a processor in communication with the memory device, the processor operative with the program to:
- receive a ringing image request message including an address of a terminating station;
- if the address is an address of a first type, retrieve a first ringing image data, including a first image data and a first ring tone data;
- if the address is an address of a second type, retrieve a second ringing image data, including a second image data and a second ring tone data;
- create a message containing the retrieved ringing image data; and
- send the message to the terminating station,
- wherein the address of a first type is an address to which an originating station has previously initiated a communication.

46. The system of claim 45 wherein the address of a first type is an address to which an originating station frequently initiates a communication.

47. The system of claim 45 wherein the first ringing image data corresponds to an informal ringing image and the second ringing image data corresponds to a formal ringing image.

* * * * *